July 18, 1967     M. T. DERBY     3,331,273
SHEET METAL NUT
Filed Nov. 22, 1965
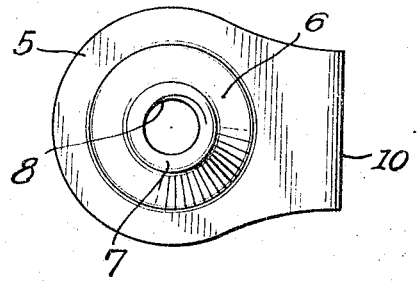
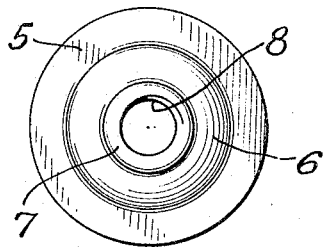
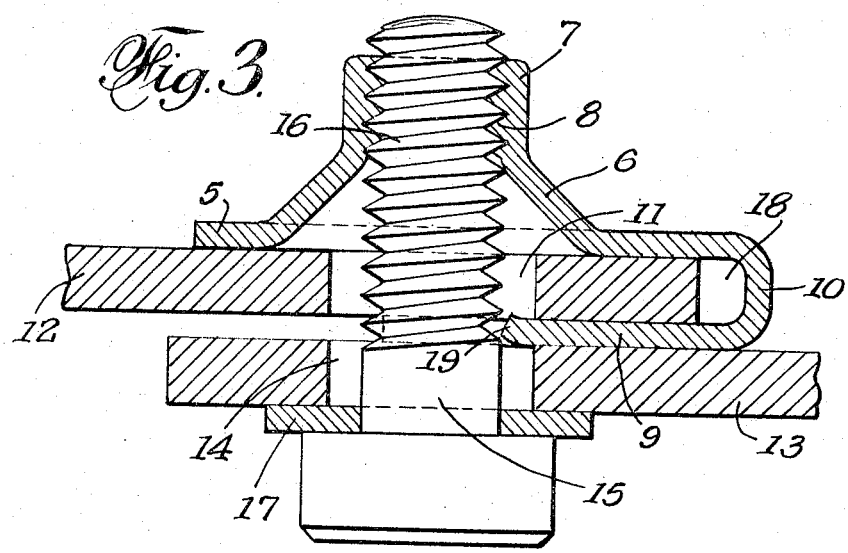
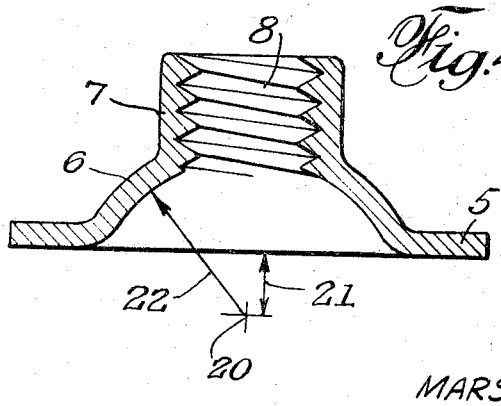
INVENTOR.
MARSHALL T. DERBY
BY C. L. Stratton
ATTORNEY United States Patent Office 3,331,273
Patented July 18, 1967

3,331,273
SHEET METAL NUT
Marshall T. Derby, Downey, Calif., assignor to California Industrial Products Inc., Santa Fe Springs, Calif., a corporation of California
Filed Nov. 22, 1965, Ser. No. 508,947
1 Claim. (Cl. 85—32)

ABSTRACT OF THE DISCLOSURE

A nut formed of heat-treatable steel in the grade range of SAE 1040 to 1075, thickness range of .025″ to .060″, and hardened from an annealed condition, after formation, to a hardness in the range of R/C 40–50. A frusto-conical portion, with a wall having an included angle approximately between 80° and 100°, being integrally connected, by its small end, to an inwardly threaded sleeve adapted for engagement by the threads of a bolt entered into said sleeve, and integrally connected by its large end, to a deformation-resistant base flange.

---

This application is a continuation-in-part of pending application, bearing the same title, Ser. No. 320,052, filed October 30, 1963, now abandoned, the latter application having been a continuation-in-part of my application, Ser. No. 776,770 filed Nov. 28, 1958, also bearing the title "Sheet Metal Nut," and now abandoned.

In the fields producing automobiles, airplanes, air conditioners, and similar multi-part devices and machines, it is frequently desirable, to save production time and costs, to have some of the components of such devices or machines provided with nuts pre-assembled thereon. One conventional method of doing this is to assemble a standard machine nut and spring clip or other retainer, called a nut retainer. An example of such a nut assembly is disclosed in Pat. No. 2,937,682. Such unit assemblies have the fault of being expensive due to the need for a pre-assembly step. The same, however, have an important advantage, and that is that the standard nuts used are strong and non-deformable, even under conditions of excess application of torque thereto, because they are formed of blocks of metal.

An object of this invention is to provide a sheet metal nut that, integrally, combines a nut and its retainer, and in which the nut has the strong and non-deformable characteristics of an ordinary machine nut.

Since the present nut has the above desirable characteristics, it is another object of the invention to provide a deforming-resistant sheet metal nut whether or not integrally combined with a sheet metal retainer.

Under normal practice, in order to produce an acceptable one-piece retainer-provided nut, it is necessary to use relatively light gauge sheet metal, otherwise forming of the retainer either would not be possible or too expensive in tool cost for commercial use. If the metal is light enough to form the retainer, it is too light for forming an acceptable nut, and conversely, if the metal is heavy enough to form a suitable nut, it will be too heavy and too bulky for economically forming a retainer.

Thus, another object of the invention is to provide a sheet metal nut inexpensively formed of sheet metal of uniform thickness that has a properly bendable retainer portion and a nut portion that meets the above indicated performance standards of a machine nut, even under conditions of use involving adverse assembly conditions, excessively large or misaligned holes or slots in the components to be pre-assembled with such retainer-provided nuts.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, preferred embodiments of the present invention, which are given by way of illustration or example only.

In the drawing, like reference characters designate similar parts in the several views.

FIG. 1 is a top plan view of a sheet metal nut according to the present invention.

FIG. 2 is a similar view of a modification.

FIG. 3 is an enlarged longitudinal sectional view of said nut in operative assembly with a screw and parts to be connected, the view showing the screw and nut in drawn-up condition.

FIG. 4 is a similarly engaged cross-sectional view of the nut shown in FIG. 2.

The material of which the nut is formed is of heat-treatable steel, preferably SAE 1050, but steels in the range of SAE 1040 to 1075 are both practical and serviceable. The gauge thickness of SAE 1050 steel may range from .025″ for nuts with #8–32 threads, to .060″ for nuts using ½″–13 threads. Larger or smaller nuts would have their material thickness increased or decreased proportionally, accordingly. The material, when to be formed into a nut, is in an annealed condition, and is then hardened by heat treating the same to obtain the most desirable hardness. The normal hardness range is R/C 40–50, with the middle of this range considered best in most cases.

The nut that is illustrated integrally comprises a base flange 5, a continuously annular and hollow truncated, substantially frusto-conical part 6 extending from the flange, and an internally threaded sleeve or collar 7 forming an extension of the smaller, outer end of the part 6. These three component parts of the nut are coaxially arranged to be on the axis of the threads 8 of said sleeve with the axis being normal to the base flange 5, said threads being V-threads and comprising plural convolutions that extend for the length of the sleeve. In the form of FIGS. 1 and 3, the base flange 5 is integrally provided with a return-bent resilient leg 9 that joins to said flange at a connecting bend 10.

The included angle of the sides of the cone 6 is preferably 90°, irrespective whether the sides are straight, as in FIGS. 1 and 3 or convex, as in FIGS. 2 and 4. Said angle should not vary more than 10° in either direction. The large or base end of the conical part 6 should be at least large enough to span the largest or farthest misplaced hole 11 in component 12 that is apt to be found as a deviation from properly sized and placed holes.

In FIG. 3, the part 12 is a component panel that is to be affixed to a sheet metal or other member 13. The latter has holes 14 that are located to be in approximate alignment or register with the holes 11 of the component 12. A bolt or screw 15 has a shank with V-threads 16 and which passes freely through such registered or aligned holes 11 and 14, a washer 17 being optionally interposed between the bolt head and the member 13. The threads of shank 16 have a running fit in the threads 8 of the collar 7 when the present nut is connected to the component 12 by inserting the edge of said component, adjacent to a hole 11, into a bifurcation 18 defined between the base flange 5 and the return-bent leg 9 until an inbent tongue 19 on said leg 9 enters the hole 11 and has snap-retention engagement with the wall of said hole, as shown. It will be clear that relative lateral movement between the component 12 and the nut is possible and that the nut may have a misaligned relationship to the hole 11.

The base flange 5 of the nut serves as the bearing face thereof and it is from this flange that the retainer portions 9, 10 and 19 extend. In instances where the nut is not to be provided with the above-described retainer portions, the base 5 may be left flat and circular, as in FIG. 2 or, if desired, provided with means, of common and well-known form, to facilitate rotation of the nut or holding the same non-rotational while the bolt 15 is turned. Finger-manipulated wings, polygonal marginal portions, or wrench or tool-engaging flanges may be provided on the flange 5 instead of the retainer portion of FIG. 3. Irrespective of how the flange 5 is extended, the same is flat, stable and resistant to expansion, and the nut portions 6 and 7, as hereinafter described, operate in the same way.

As touched on hereinbefore, the purpose of the above-described design, shape, material selection, and heat treating of the sheet metal nut is, basically, to produce a nut formed of relatively light gauge material and yet will be serviceable and, in many instances, superior to a conventional machine nut formed of block material.

To vary materially from the present nut design as, for instance, to appreciably increase the included angle of the cone sides, form said sides concave rather than straight or convex, would, at best, limit the nut to light duty applications. To decrease the included cone sides angle appreciably would not materially increase the resistance of the nut to deform, but would result in both a reduction of base bearing surface, and an increase in height, both of which are not desirable, as well as limiting the range of lateral displacement of the nut with relation to hole 11 of the component 12.

In the same manner that conventional machine nuts do not appreciably deform under normal torque and tension on the threads thereof, the present nut is similarly stable and resistant to distortion under comparable conditions.

No mention has as yet been made of the locking aspects, if any, of the nut under normal or even excessive torque. The reason for this is that the nut is not designed with these aspects in view. Since appreciable distortion or deformation of the nut should not occur until normal torque or tension is materially exceeded, dependence cannot be placed on cone deformation causing a bind on the threads of the collar and screw shank. Thus, it is important to successful functioning of the nut that such deformation be of such small degree as not to impair or reduce the operative contact of the threads, as mentioned.

Due to the reinforcement of the base of the cone 6 by the base flange 5, said cone base cannot expand when the threads 8 and 16 are engaged as torque is being applied to the bolt 15. The slopes of the V-threads 8 and 16 normally produce an expanding bias on the collar 7, as the bolt 15 is placed in tension by such torque, but the same is resisted by the small end of the cone 6 which, due to the engagement of the threads 8 of collar 7 with the tension bolt shank 15, is biased in a longitudinal direction—the direction in which the bolt is tensioned. Because of the inward slope of the wall of cone 6, said small end of the cone tends to contract inwardly toward the bolt axis tending toward a comparable contraction of the adjacent end of the threaded sleeve 7. This contraction tendency counteracts the tendency of the sleeve to expand due to the wedging or camming forces by the threads 16 on the sleeve threads 8 and causes a substantially static, nondeformed and friction-tight engagement of the threads 8 and 16 that keeps the bolt 15 from backing off, thereby effecting a thread engagement that has little or no deformation of the sheet metal nut. The bolt may, if the occasion warrants, be removed by application of reverse torque and then replaced in the same nut, in the manner above described.

The above-described contraction of the small end of the cone 6 occurs in both the straight-sided and convex-sided cones of the two nuts illustrated. In the nut shown in FIG. 4, the cone wall has the form of a spherical segment, and the convexity of said wall is preferably generated around a center 20 that is spaced below the plane of the base flange 5 a distance 21 that is one-half to one-third that of the radius 22 on which said convexity of the cone is generated. It will be evident that the small end of the convexly curved cone 6 will have the same tendency to contract as does the small end of the straight-sided cone.

The foregoing describes an inter-engagement of a bolt and a sheet metal nut that not only is effective to retain the bolt engagement with the nut but does so without deformation of the nut and also in a manner that obviates or, a least, greatly reduces the stripping of the threads either of the nut or the bolt.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claim.

Having thus described this invention, what is claimed and desired to be secured by Letters Patent is:

A sheet metal nut comprising:
(a) an internally threaded sleeve of continuous annular form and adapted for interior engagement over an extended area with the shank of a bolt having V-threads and adapted to be removably secured to the threads of the nut,
(b) the threads of said sleeve being V-threads to suit those of the bolt shank and the same comprising plural convolutions that extend for the length of the sleeve,
(c) a continuously annular deformation-resistant frusto-conical connecting portion having its smaller end integral with said sleeve, said portion being coaxial with the sleeve and having a substantially straight-sided wall with an included angle between about 80° and 100° and extending longitudinally therefrom, and the end of said portion opposite to the end connected to the sleeve being substantially larger than said smaller end and constituting the base of said frusto-conical portion, and
(d) a flat, deformation-resistant base flange integral with the base of the frusto-conical connecting portion, said flange completely encircling said base of the frusto-conical portion to reinforce and resist expansion of said portion when the bolt shank is engaged with the threads of the collar and is placed in tension along its axis in a direction to bias the collar toward the connecting portion,
(e) the small end of the wall of the frusto-conical portion, during such bias on the collar, being drawn in a direction longitudinally parallel to the axis of said shank and being contracted inwardly in a direction toward said axis to counteract the tendency for the collar to expand under spreading bias between the slopes of the V-threads of the collar and the elongated member, (f) the nut being formed of heat-treatable steel in the grade range of SAE 1040 to 1075, of a thickness in the approximate range .025" to .060", and hardened, from an annealed condition, after formation, to a hardness in the range of R/C 40-50.

References Cited

UNITED STATES PATENTS

| | | | |
|---|---|---|---|
| Re. 24,793 | 3/1960 | Randall | 151—21 |
| 1,106,082 | 8/1914 | Crane | 85—32 |
| 1,179,861 | 4/1916 | Oehrle | 151—21 |
| 2,088,100 | 7/1937 | Watson | 85—32 |
| 2,255,650 | 9/1941 | Burke | 151—41.75 |
| 2,258,845 | 10/1941 | Burke | 151—41.75 |
| 2,279,388 | 4/1942 | Cox | 151—21 |
| 2,385,991 | 10/1945 | Huntoon | 151—21 |
| 2,576,643 | 11/1951 | Roerig | 85—32 |
| 2,581,312 | 1/1952 | Tinnerman | 151—21 |
| 2,855,013 | 10/1958 | Lillard | 151—21 |
| 2,889,564 | 6/1959 | Pavlinetz | 85—32 |
| 3,189,076 | 6/1965 | Adams | 151—41.75 |
| 3,229,743 | 1/1966 | Derby | 151—41.75 |

FOREIGN PATENTS

| | | |
|---|---|---|
| 562,633 | 9/1923 | France. |
| 886,981 | 8/1953 | Germany. |
| 760,297 | 10/1956 | Great Britain. |

CARL W. TOMLIN, *Primary Examiner.*

M. PARSONS, Jr., *Assistant Examiner.*